United States Patent
Smith

[19]

[11] Patent Number: 5,887,884
[45] Date of Patent: Mar. 30, 1999

[54] TRAILER HITCH APPARATUS

[76] Inventor: Philip E. Smith, 3732 Electro Way, Redding, Calif. 96002

[21] Appl. No.: 790,909

[22] Filed: Jan. 29, 1997

Related U.S. Application Data

[60] Provisional application No. 60/011,594 Jan. 29, 1996.

[51] Int. Cl.[6] ....................................................... B60D 1/00
[52] U.S. Cl. ............................................ 280/489; 280/485
[58] Field of Search ..................................... 280/483–485, 280/489, 491.2, 490.1; 267/138, 150

[56] References Cited

U.S. PATENT DOCUMENTS

| | | |
|---|---|---|
| 2,523,733 | 9/1950 | Stephens . |
| 2,966,369 | 12/1960 | Paul, Jr. . |
| 3,180,657 | 4/1965 | Molter, Sr. . |
| 3,223,435 | 12/1965 | Yarbrough . |
| 3,284,098 | 11/1966 | Worley . |
| 3,342,509 | 9/1967 | Sancioni . |
| 3,900,212 | 8/1975 | Ewing ...................................... 280/489 |
| 4,351,542 | 9/1982 | Lovell et al. . |
| 4,773,668 | 9/1988 | Muonro .................................... 280/485 |

FOREIGN PATENT DOCUMENTS 1538914   7/1968   France .

*Primary Examiner*—Robert J. Oberleitner
*Assistant Examiner*—C. T. Bartz
*Attorney, Agent, or Firm*—John P. O'Banion

[57] ABSTRACT

A trailer hitch assembly having a connecting arm disposed within a sleeve and pivotally coupled within the sleeve by a bolt. A tongue at the distal end of the arm rests on one or more air cushions which provide damping or shock absorption to the coupled arm and sleeve during travel. The air cushions are mounted between the tongue and a cross brace of a trailer frame assembly. A hitch coupling is included at a distal end of the arm for engaging a hitch on a towing vehicle. Inflation or deflation of the air cushions allows adjustment of the amount of shock absorption according to the trailer load or road surface conditions.

13 Claims, 3 Drawing Sheets

TRAILER HITCH APPARATUS

CROSS-REFERENCE TO RELATED APPLICATIONS

This application is related to and claims the priority of co-pending U.S. provisional patent application Ser. No. 60/011,594 filed on Jan. 29, 1996.

BACKGROUND OF THE INVENTION

1. Field of the Invention

This invention pertains generally to devices and methods for hitching or coupling trailers to vehicles, and more particularly to a trailer hitch assembly having a cushioned coupling to provide shock absorption to the trailer hitch during travel.

2. Description of the Background Art

Wheeled trailers are frequently towed behind automobiles, trucks and other vehicles to transport various items such as small boats, campers, and loads of freight. A variety of trailer hitch or tow hitch devices and assemblies have been developed to facilitate towing of trailers.

A common problem with known trailer hitches and couplings is that bumps and uneven road surfaces generate shocks and vibrations which result in damage, wear and eventual failure of the hitch or coupling assembly. Trailer hitches having shock absorbers have been developed to address this problem, but known trailer hitches suffer from various deficiencies. Particularly, the amount of shock absorption provided by many trailer hitches is not adjustable or cannot be adjusted to accommodate varying trailer loads. Additionally, trailer hitches having sophisticated shock absorbing systems to handle varying trailer loads tend to be expensive and complex, and are not readily usable for towing relatively small trailers behind light trucks.

Accordingly, there is a need for a trailer hitch having adjustable cushioning for providing shock absorption suitable for varying trailer loads, which is inexpensive, and which is easy to use. The present invention satisfies these needs, as well as others, and generally overcomes the deficiencies found in the background art.

SUMMARY OF THE INVENTION

The present invention is a trailer hitch apparatus having adjustable cushioning means to accommodate varying trailer loads. In general terms, the invention comprises a connecting tongue, a trailer hitch on a proximal end of the tongue, a sleeve or channel member which accommodates the tongue, and cushioning means at a distal end of the arm for providing shock absorption. A trailer support frame is coupled to the channel member, and the hitch at the proximal end of the tongue couples the invention to a towing vehicle.

By way of example and not of limitation, the cushioning means comprises one or more reversibly inflatable air cushions disposed between a spatulate portion at the distal end of the connecting tongue and a cross brace of the trailer frame. The tongue is engaged in the sleeve, and the tongue and sleeve are coupled together by a pin or bolt. The trailer hitch on the distal end of the connecting arm is preferably a conventional hitch arrangement such as a socket portion to accommodate a ball portion on a towing vehicle.

In operation, the pin or bolt connecting the tongue and sleeve together allows a range of pivotal play or motion between the tongue and sleeve and about the bolt. The spatulate end rests or floats on the air cushions. By inflating or deflating the air cushions by a desired amount according to the trailer load, road surface to be traveled, or other factors, the amount of pivotal play between the connecting tongue and sleeve may be accurately adjusted.

An object of the invention is to provide a trailer hitch apparatus with adjustable cushioning for shock absorption.

Another object of the invention is to provide a trailer hitch apparatus which minimizes wear and fatigue and reduces failure in moving parts.

Another object of the invention is to provide a trailer hitch apparatus which is inexpensive to make and easy to use.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
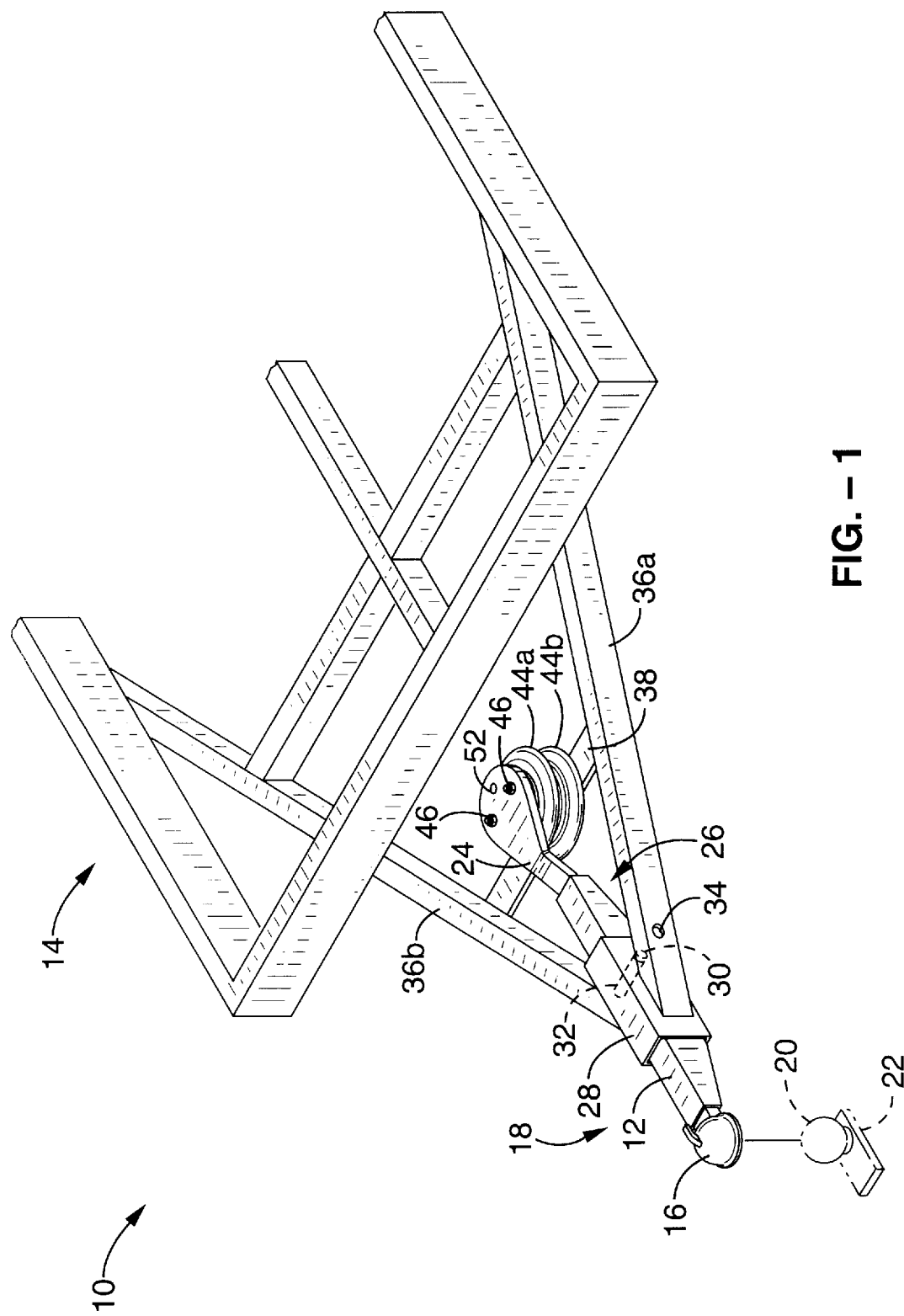
FIG. 1 is a perspective view of a trailer hitch apparatus in accordance with the present invention, shown attached to a trailer frame assembly.
Figure 2:
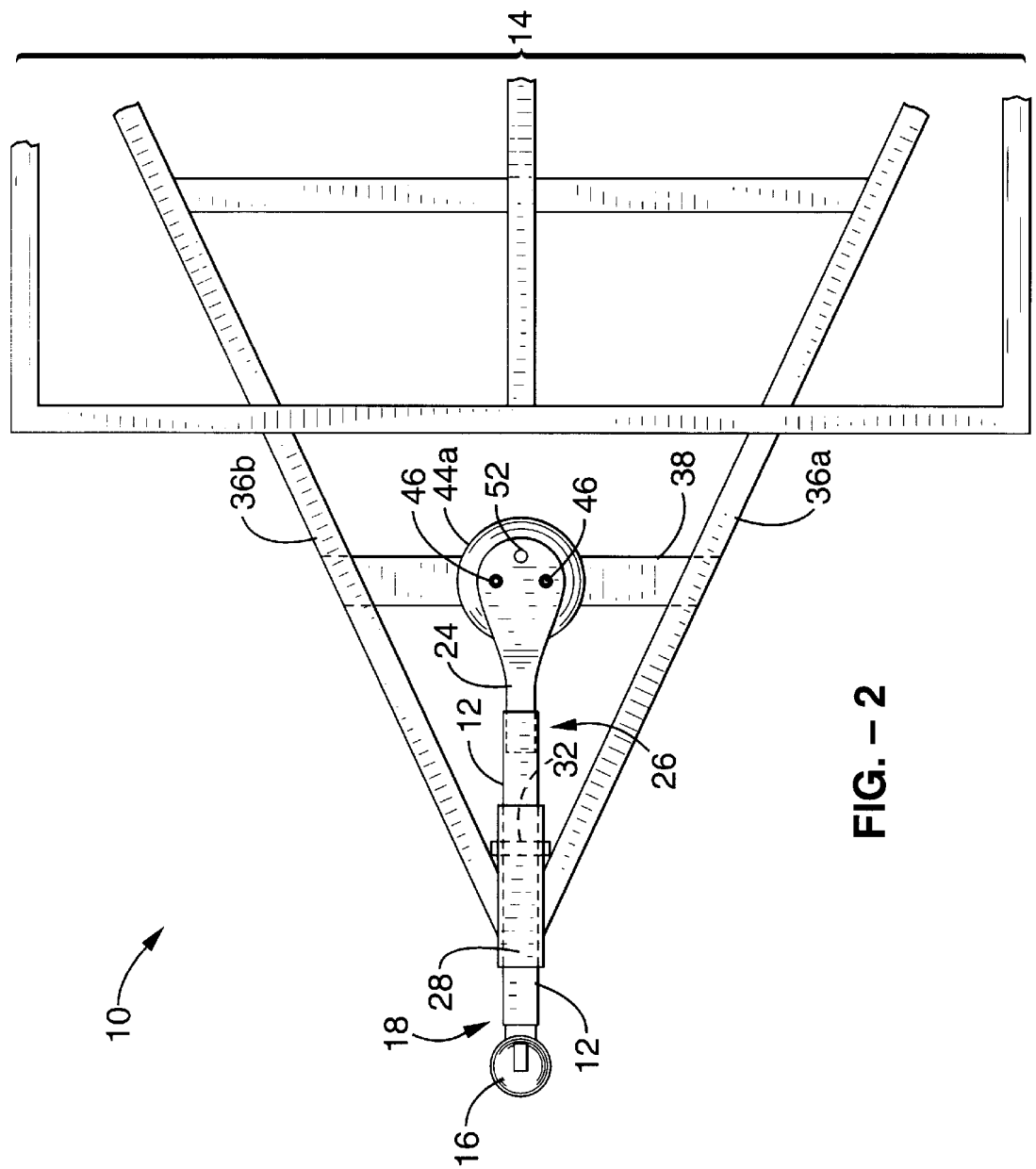
FIG. 2 is a top plan view of the trailer hitch apparatus and frame assembly of FIG. 1.
Figure 3:
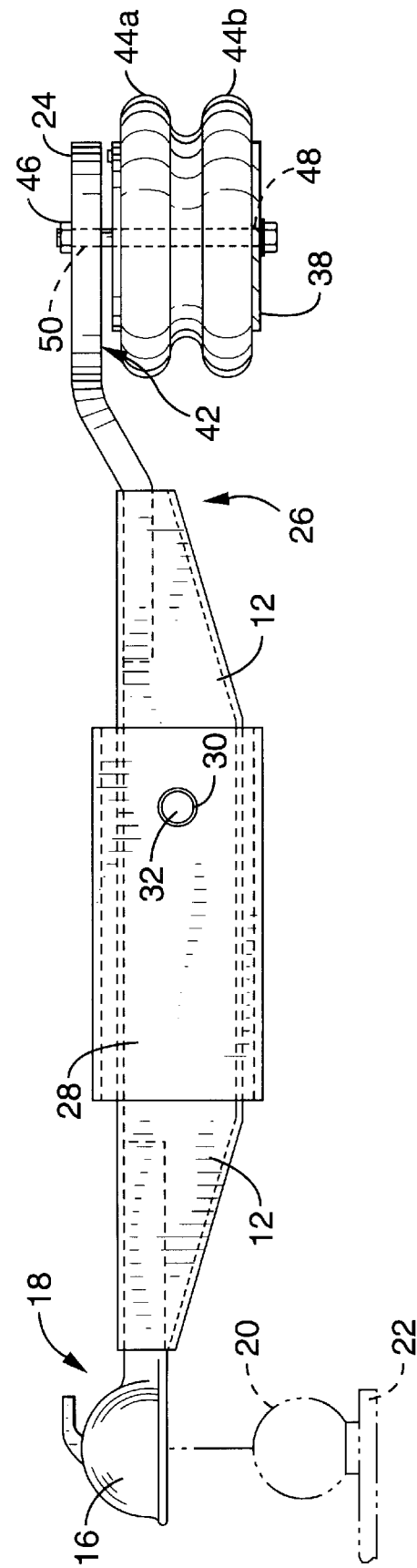
FIG. 3 is a side view of the trailer hitch apparatus of the invention shown without the trailer frame assembly.

Referring more specifically to the drawings, for illustrative purposes the present invention is embodied in the apparatus generally shown in FIG. 1 through FIG. 3. It will be appreciated that the apparatus may vary as to configuration and as to details of the parts without departing from the basic concepts as disclosed herein.

Referring now to FIG. 1 through FIG. 3, a trailer hitch apparatus 10 in accordance with the present invention is generally shown. The apparatus 10 includes a connecting arm 12 which extends between a towing vehicle (not shown) and a trailer frame assembly 14. A hitch coupler 16 is connected to a first or proximal end 18 of arm 12, with hitch coupler 16 structured and configured to reversibly engage a conventional ball hitch 20 or the like mounted on the towing vehicle by a tongue 22. A flattened or spatulate tongue 24 is included on a second or distal end 26 of arm 12, with tongue 24 preferably elevated or raised relative to arm 12. Arm 12 is preferably elongated in shape and of generally rectangular cross section, although other structures and configuration of arm 12 may be used with the invention. Arm 12 is preferably constructed of steel or like metal alloy, and hitch coupler 16 and spatulate tongue 24 are preferably coupled to arm by welding, bolts, or other standard attachment means.

A channel member or sleeve 28 is included with the invention, with sleeve 28 structured and configured to slidably engage or receive arm 12 therewithin. Sleeve 28 is preferably of rectangular cross section to accommodate arm 12. A bore or aperture (not shown) is provided in arm 12, and a corresponding bore or aperture 30 is included in sleeve 28, so that arm 12 and sleeve 28 may be coupled together by a pin or bolt 32 accessible through opening 34 in frame member 36a when arm 12 is engaged in sleeve 28. Arm 12 and sleeve 28 are structured and configured so that a range of vertical pivotal or rocking motion about bolt 32 is obtained while arm 12 and sleeve 28 are coupled together by bolt 32, to allow for shocks or vibrations due to road travel, as discussed further below. Sleeve 28 may alternatively comprise a U-shaped channel member or like piece of hardware which can receive or engage arm 12. During fabrication of the apparatus, tongue 24 preferably is welded or bolted onto distal end 26 of arm 12 after arm 12 is engaged within sleeve 28, so that arm 12 is retained within sleeve 28 by tongue 24 and hitch coupler 16 at the distal and proximal ends 26, 18 of arm 12 respectively.

Trailer frame assembly 14 generally includes a pair of angled frame members 36a, 36b which are coupled to sleeve 28 by welding, bolts, or like means, to define an "A"-shaped assembly. A cross brace 38 is coupled to and extends between frame members 36a, 36b. Frame assembly 14 is of conventional construction and may be varied in structure and configuration according to need, and is not discussed further herein. Cross brace 38 includes an upper, generally horizontal surface 40 (FIG. 3) which is opposite a lower, generally horizontal surface 42 (FIG. 3) on tongue 24. Frame members 36a, 36b are preferably welded or bolted to sleeve 28. Sleeve 28 may alternatively be coupled to other portions of frame assembly 14 if desired. Bolt 34 may extend through frame members 36a, 36b as shown in FIG. 1.

Cushioning means are provided with the invention, and preferably comprise one or more reversibly inflatable air cushions or tires 44a, 44b, which are positioned between lower surface 42 of tongue 24 and upper surface 40 of front brace. Air cushions 44a, 44b are preferably cylindrical "tire"-shaped cushions, and bolts 46, which engage bores 48 (FIG. 3) in cross brace and bores 50 in tongue 24 are used to retain air cushions 44a, 44b between tongue 24 and cross brace 38. A chock or hub (not shown) maybe positioned and used in the center of air cushions 44a, 44b in association with bolts 46 and between tongue 24 and cross brace 38. A larger or smaller number of air cushions may be used with the invention depending upon the load to be hauled and the amount of damping or shock absorption required. Air inlets or valves 52 (FIG. 2) are provided on air cushions 44a, 44b to allow inflation of cushions 44a, 44b with compressed air or other gas, or to allow deflation cushions 44a, 44b. The cushioning means 44a, 44b of the invention may alternatively be placed between tongue 24 and another portion of frame assembly 14 which has a suitable horizontal surface. The cushioning means 44a, 44b could alternatively comprise cushions filled with water or other fluid rather than air.

The trailer hitch apparatus 10 is utilized by engaging hitch coupler 16 on to ball hitch 20 in a conventional manner, to link the towing vehicle to the trailer hitch apparatus 10. Pin or bolt 32 is inserted through sleeve 28 and connecting arm 12 to pivotally couple arm 12 and sleeve 28 together. Air cushions 44a, 44b are positioned between lower surface 42 of tongue 24 and upper surface 40 of cross brace 38, and bolts 46 are engaged within bores 50 of tongue and bores 48 of cross brace 38. Air cushions 44a, 44b are inflated, as discussed below, so that tongue 24 rests upon the uppermost air cushion 44b.

Referring more particularly to FIG. 3, it can be seen that connecting arm 12 is positioned within sleeve 28 such that arm 12 can undergo a range of pivotal or rocking motion or play within sleeve 28 about bolt 32. This play between arm 12 and sleeve 28 provides for shock absorption or damping by air cushions 44a, 44b to prevent damage to arm 12, sleeve 28, bolt 32, and other portions of the apparatus 10 during travel as the towing vehicle and trailer encounter bumps or other uneven road surface features. By inflating or deflating air cushions 44a, 44b by means of air valves 52 by a conventional air compressor or hand pump (not shown), the amount of play or rocking motion between arm 12 and sleeve 28 may be quickly, easily and accurately adjusted. Further adjustment may be obtained by tightening or loosening bolts 46 to control the distance between lower surface 42 of tongue 24 and upper surface 40 of cross brace. Air cushions 44a, 44b are generally resilient, with the amount of resiliency of air cushions 44a, 44b generally controlled by the amount of air pressure in the cushions. As bumps are experienced during road travel which cause arm 12 to pivot or rock within sleeve 28 about bolt 32, resilient air cushions 44a, 44b apply a damping or shock absorbing force to tongue 24 and thus to connecting arm 12. Thus, the trailer hitch apparatus of the invention allows for shock absorption which can be quickly and easily adjusted for varying trailer loads and road surfaces.

Accordingly, it will be seen that this invention provides a trailer hitch apparatus with cushioning means for shock absorption which are quickly and easily adjustable. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. A cushioned trailer hitch apparatus for connecting to the cross brace of a trailer frame on a vehicle, comprising:
   (a) a connecting arm, said connecting arm including a first and a second end;
   (b) a hitch coupler connected to said first end of said connecting arm;
   (c) a tongue connected to said second end of said connecting arm;
   (d) a sleeve pivotally coupled to said connecting arm;
   (e) cushion means, directly attached below the connecting arm and the cross brace and not extending below the vertical level of the cross brace, for absorbing shock between said connecting arm and the trailer frame when said sleeve is connected to the trailer frame.

2. An apparatus as recited in claim 1, further comprising a pair of trailer frame members having converging ends coupled to said sleeve, and a cross brace between said frame members, said cushion means positioned between said tongue and said cross brace.

3. An apparatus as recited in claim 1, wherein said cushion means is inflatable.

4. An apparatus as recited in claim 1, wherein the relative positions of said connecting arm and said sleeve are adjustable by said cushion means.

5. An apparatus as recited in claim 1, wherein said cushion means including means for adjusting the relative positions between said connecting arm and said sleeve.

6. A cushioned trailer hitch apparatus for connecting to a trailer frame on a vehicle, comprising:
   (a) a connecting arm, said connecting arm including a first and a second end;
   (b) a hitch coupler connected to said first end of said connecting arm;
   (c) a tongue connected to said second end of said connecting arm;
   (d) a sleeve pivotally coupled to said connecting arm;
   (e) said sleeve adapted to be coupled to a pair of trailer frame members having converging ends;

(f) a cross brace between said frame members; and (g) cushion means, directly attached below the connecting arm and the cross brace and not extending below the vertical level of the cross brace, for absorbing shock between said connecting arm and said cross brace.

7. An apparatus as recited in claim 6, wherein said cushion means is inflatable.

8. An apparatus as recited in claim 6, wherein the relative positions of said connecting arm and said sleeve are adjustable by said cushion means.

9. An apparatus as recited in claim 6, wherein said cushion means including means for adjusting the relative positions between said connecting arm and said sleeve.

10. A cushioned trailer hitch apparatus, comprising:

(a) a connecting arm, said connecting arm including a first and a second end;

(b) a hitch coupler connected to said first end of said connecting arm;

(c) a tongue connected to said second end of said connecting arm;

(d) a sleeve pivotally coupled to said connecting arm;

(e) a trailer frame, said trailer frame including a pair of frame members having converging ends coupled to said sleeve;

(f) a cross brace between said frame members; and (g) cushion means, directly attached below the connecting arm and the cross brace and not extending below the vertical level of the cross brace, for absorbing shock between said connecting arm and said cross brace.

11. An apparatus as recited in claim 10, wherein said cushion means is inflatable.

12. An apparatus as recited in claim 11, wherein the relative positions of said connecting arm and said sleeve are adjustable by inflating and deflating said cushion means.

13. An apparatus as recited in claim 10, wherein said cushion means including means for adjusting the relative positions between said connecting arm and said sleeve.

* * * * *